United States Patent

[11] 3,609,631

| [72] | Inventors | Robert L. Looney<br>4816 South Madison, Tulsa, Okla. 74105;<br>John S. Work, 3742 East 45th Place, Tulsa, Okla. 74135 |
|---|---|---|
| [21] | Appl. No. | 793,520 |
| [22] | Filed | Jan. 23, 1969 |
| [45] | Patented | Sept. 28, 1971 |

[54] ADJUSTABLE GROUND CLAMP
8 Claims, 3 Drawing Figs.

[52] U.S. Cl. ............................................... 339/14, 339/251
[51] Int. Cl. ............................................... H01r 3/06
[50] Field of Search ............................................... 339/14, 251, 95, 272, 243

[56] References Cited
UNITED STATES PATENTS

| 1,932,602 | 10/1933 | Ratta | 339/251 X |
| 2,281,366 | 4/1942 | Metcalf | 339/251 X |
| 3,013,241 | 12/1961 | Wing | 339/251 X |
| 3,129,994 | 4/1964 | Harmon et al. | 339/251 X |
| 3,139,317 | 6/1964 | Lynch | 339/251 |

Primary Examiner—David H. Brown
Attorney—Robert E. Massa

ABSTRACT: A ground clamp for a pipe-welding apparatus includes an arcuate support member positionable upon and insulated from the work to be welded and flexible chain or cable means attachable to the support frame, and adjustable and lockable to secure the ground clamp into position upon the work. The support frame includes a sharply pointed grounding member biasable against the work to be grounded and having one end in ground connection to the welding apparatus. The ends of the ground clamp resting upon the work includes insulating members to insulate the frame from the work and the point of connection of the flexible chain or cable may also include insulating means to insulate the chain or cable from the work.

INVENTOR.
ROBERT L. LOONEY
JOHN S. WORK
ATTORNEY

INVENTOR.
ROBERT L. LOONEY
JOHN S. WORK

ADJUSTABLE GROUND CLAMP

BACKGROUND OF THE INVENTION

In welding operations extraneous current is always prevalent and when a portion of the welding apparatus touches the work being welded, a portion of this extraneous current may be carried along the apparatus and passed to the work whenever contact is made. This current then changes the metal structure of the work, and, for instance, if the work happens to be a pipeline, the site where the contact is made provides a site for rapid corrosion of the pipeline. These sites are discovered during inspection of the pipeline, and the only way to prevent the anticipated corrosion is to provide a new weld at the site of contact. During the normal pipeline operations, many of these grounded spots occur, and a great deal of time and expense is involved in welding over these sites. The use of the apparatus of this invention provides an efficient grounding means so that only one grounded spot occurs during any single welding operation. Thus, after any single welding operation it is necessary to weld only a single spot thereby saving considerable time and money.

Therefore, the primary object of this invention is to provide a ground clamp for welding apparatus which is easy to use, efficient in operation, and inexpensive to manufacture.

Another object of this invention is to provide a ground clamp for welding apparatus which will enhance the safety of the welding apparatus.

Still another object of this invention is to provide a ground clamp for welding apparatus which can be placed in position quickly and easily.

Another object of this invention is to provide a ground clamp for welding apparatus which can be positioned securely upon the object being welded even when that object is of irregular shape.

Another object of this invention is to provide a ground clamp for welding apparatus which can be easily and quickly applied to an object being welded by the person doing the welding with minimal effort and still be out of that person's way during the operation.

Another important object of this invention is to provide a ground clamp for welding apparatus which will serve to eliminate numerous other grounded spots during welding operations.

BRIEF DESCRIPTION OF THE DRAWINGS

Further objects and advantages of the invention will become apparent from the following description and claims, and from the accompanying drawings, wherein:

DESCRIPTION OF THE PREFERRED EMBODIMENTS

The ground clamp of this invention includes an arcuate support frame which is intended to fit circumferentially upon the object being welded, such as a pipe joint, with the arcuate support frame held in position securely by means of a flexible chain or cable surrounding the work and lockable in position to one end of the support frame. The support frame and the flexible chain or cable are insulated from the object being welded upon so that any grounding current can pass most efficiently to a grounding member attached operably to the support frame and biasable against the work being welded in order to concentrate the grounding current to a small area provided by contact of the grounding member with the work. Most conveniently, insulating means can be provided on end portions of the support frame which are in contact with the work and at positions where flexible attaching means are secured to the support frame.

Figure 1:
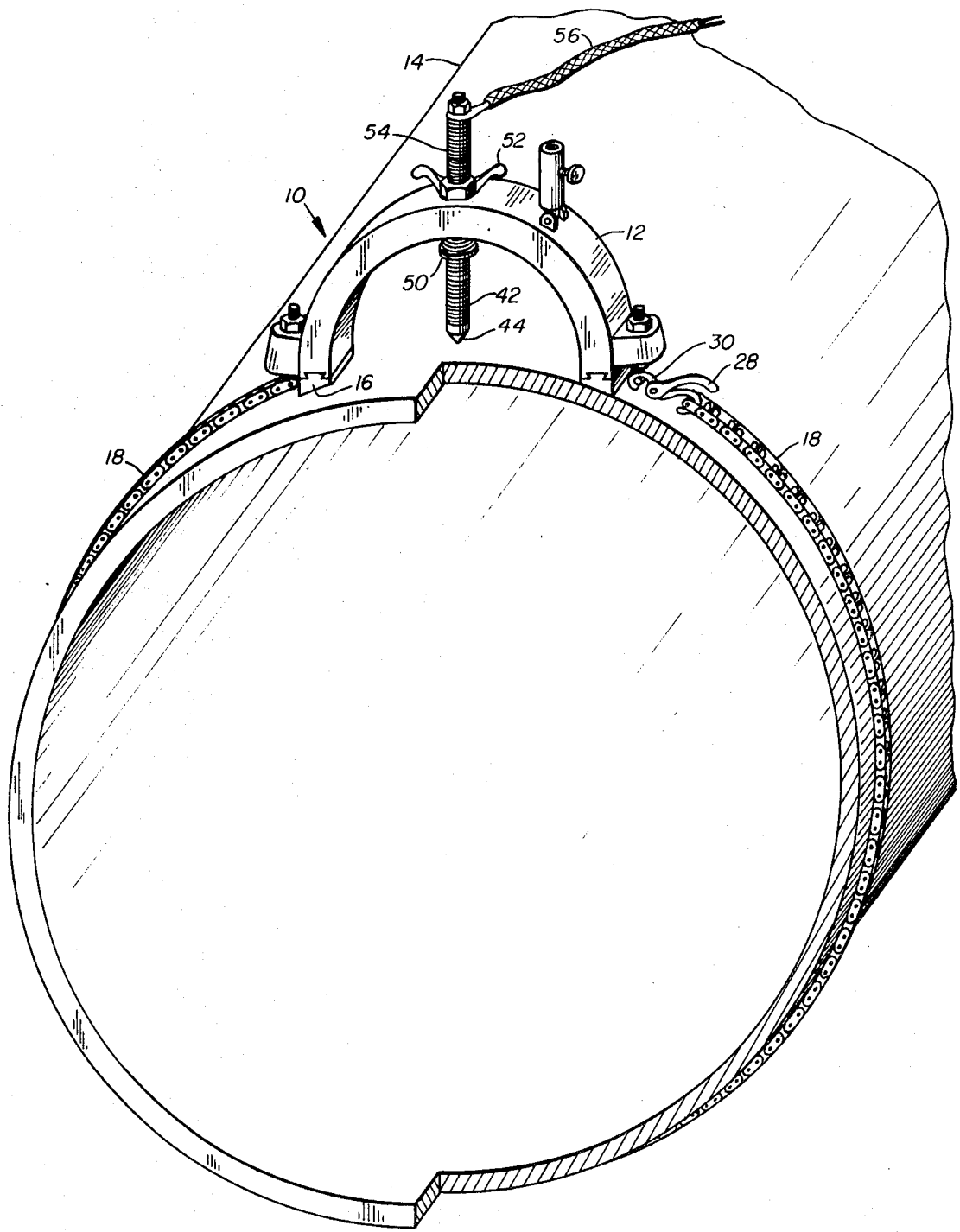
FIG. 1 is a perspective view of a ground clamp for welding apparatus according to this invention showing the clamp in position upon a piece of work being welded.
Figure 2:
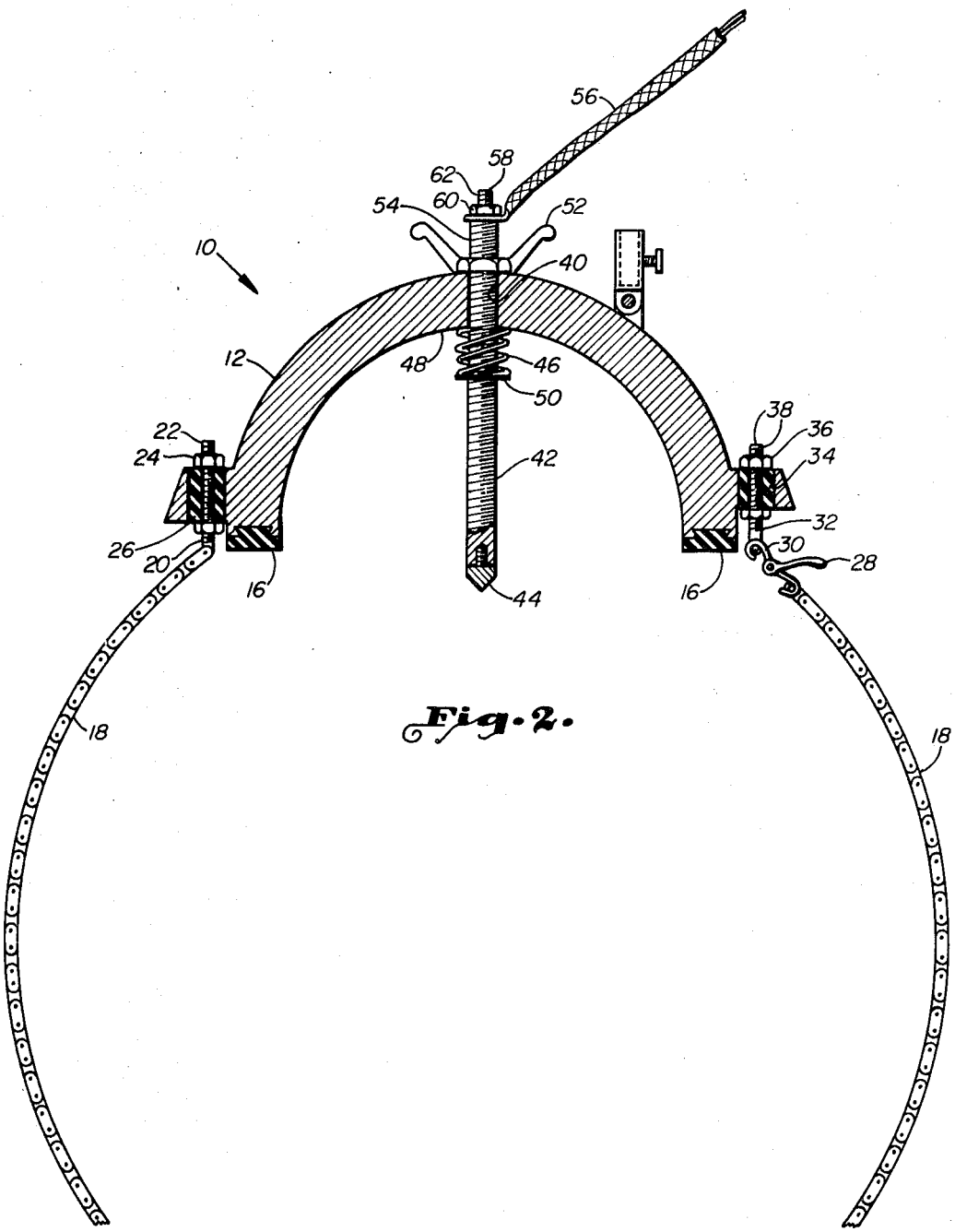
FIG. 2 is a cross-sectional view of a ground clamp according to this invention.

Referring now to the drawings in detail, FIG. 1 describes one embodiment of a ground clamp 10, generally, according to this invention showing its manner of being positioned upon work undergoing welding operation, in this instance, pipe joint. Ground clamp 10 includes an arcuate support frame 12 which is designed to rest securely upon the work being welded as circumferentially about a pipe joint 14. The arcuate design of support frame 12 is particularly efficient for positioning upon cylindrical objects, but the ground clamp of this invention is not to be limited to use on such cylindrical objects, as it can rest equally well on irregular shapes, provided certain insulating requirements are observed. Thus, support frame 12 is generally insulated from the work being welded by means of insulating members 16. These insulating members may be of conventional insulating material such as rubber, nylon, or Teflon. The figures show insulating member 16 to be imbedded immovably in ends of the arcuate support frame, but these members 16 may also be designed to be pivotally attached to the ends of the support frame so that they may conform to some degree to the surface upon which they rest. As stated above, the use of this ground clamp is intended to provide a single small area for a ground current to appear on the work being welded upon. Thus, insulating members 16 are provided to maintain the support frame 12 in spaced relationship from a work being welded upon so that additional ground spots will not appear.

As shown in FIG. 1, the ground clamp is held in position on the work by means of a flexible member which in FIG. 1 is shown as a chain 18. If desired instead of a chain, this flexible member may be a cable or like device. In addition, the flexible member may be covered with tubular sheathing material for additional insulating purposes or for protection of the work being welded. Chain 18 may be conveniently attached by one end to the support frame by means of attachment to a bolt member 20 having threads 22 and being secured by nut 24. For insulation of chain 18 from the object being welded, bolt 20 passes through an insulating bushing 26 which, as with insulating members 16, may be rubber, nylon, Teflon, or some other suitable insulating material. It is also conceivable that in some installations insulating members 16 and insulating bushing 26 may be combined in one unit to provide proper insulation for the support frame 12, chain 18, and suitable member for attachment of chain 18 to the support frame. It should be observed that suitable arrangement of bolt 20 and nut 24 will provide for adjustable attachment of chain 18 to the support frame.

Figure 3:
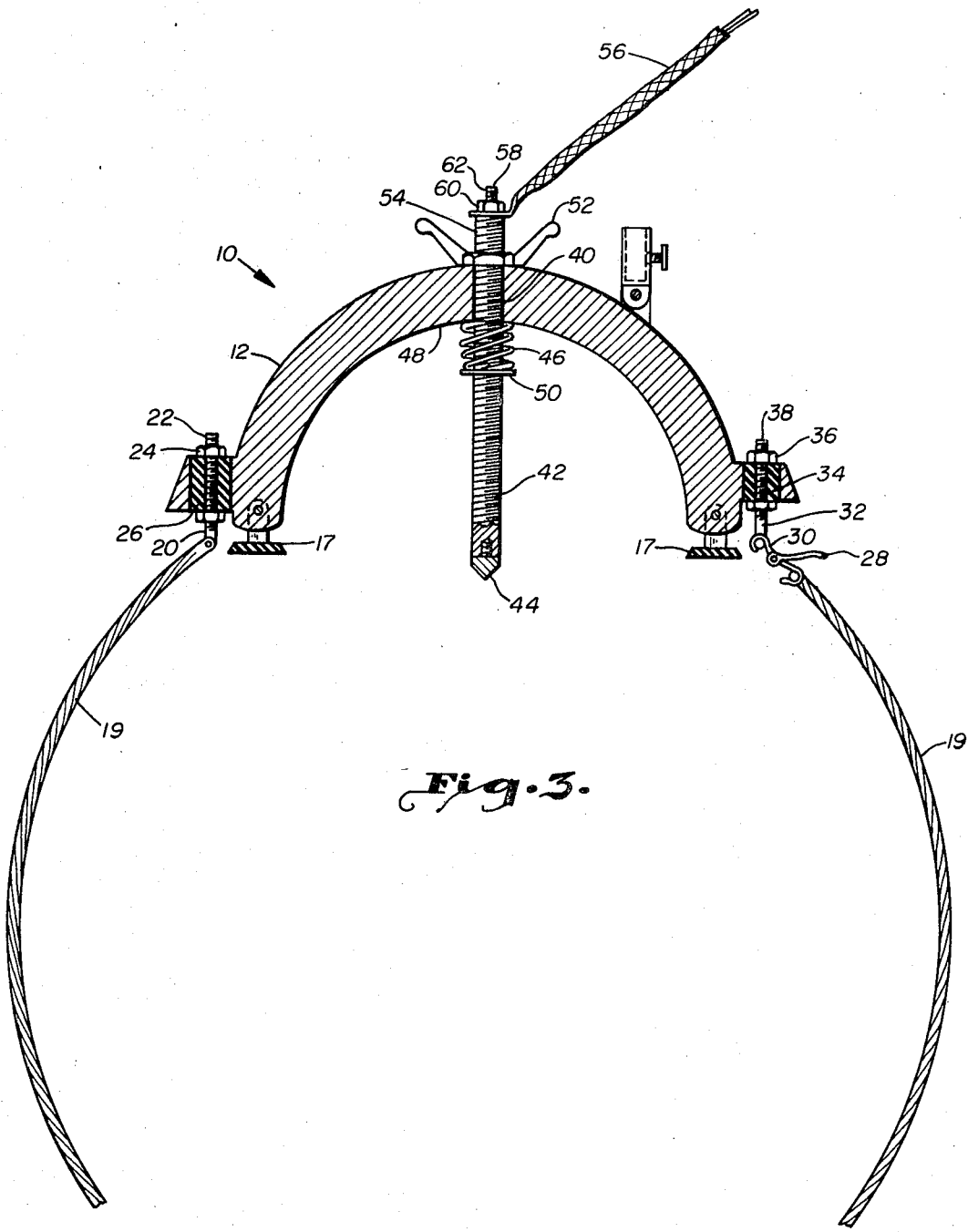
FIG. 3 is a fragmentary cross-sectional view of a ground clamp according to this invention describing an alternate embodiment.

FIG. 3 describes an alternate embodiment of the invention in which a cable 19 may be employed instead of chain 18, and in which pivotally attached insulating members 17 may be employed instead of insulating members 16.

With support frame 12 in position atop the work to be welded, chain 18 is positioned around the work and holds support frame 12 in secure position by means of suitable lockable engagement with lockable means adjacent a second end of support frame 12 as by cooperation of lock member 28 with a hook portion 30 of a bolt 32 passing through bushing 34 and held in position by cooperation of threaded nut 36 with threaded portion 38 of bolt 32. Suitable positioning of bolt 32 with regard to nut 36 will provide for additional adjustment of chain 18.

A passageway 40 in support frame 12 provides for passage therethrough of a grounding member 42 which is suitably provided with a replaceable sharply pointed grounding tip 44 for intimate contact with the work to be welded. Grounding member 42 is biased against the work such as pipe joint 14 by compression of a spring member 46 between interior surface 48 and stop member 50. Proper adjustment of the position of grounding member 42 may be achieved by cooperation of nut member 52 with threads 54 of grounding member 42. In operation grounding tip 44 is in contact with the work being welded and grounding contacts through member 42 and the circuit is completed by cooperation of the ground wire 56 positioned around the reduced portion 58 of grounding member 42 and secured thereto by cooperation of a nut 60 with threads 62 on portion 58. Thus, with the ground clamp of this invention in stable position on the work being welded, grounding tip 44 is strongly biased to an intimate contact with the work so that all grounding current may flow through this grounding device.

Since many different embodiments of this invention may be made without departing from the spirit and scope thereof, it is to be understood that the specific embodiments described herein are not to be taken in a limiting sense, since the scope of this invention is best defined by the appended claims.

I claim:

1. A ground clamp comprising:
   an arcuate support frame, positionable to fit circumferentially of work to be welded,
   flexible adjustable means attachable to said support frame to hold said clamp securely in position,
   ground means on said support frame to provide grounding contact therewith,
   means biasing said ground means against said work, and
   insulating means on said support frame to insulate said support frame from said work.
2. A ground clamp as described in claim 1 wherein:
   said flexible means includes a chain or cable, said chain or cable having lockable means at an end thereof to cooperate with lockable means on said frame.
3. A ground clamp as described in claim 2 wherein:
   said arcuate support frame includes said insulating means adjacent a first end and adjacent a second end of said support frame.
4. A ground clamp as described in claim 3 wherein:
   said insulating means includes first and second insulating members adjacent first and second ends of said support frame to insulate said support frame from said work, and
   third and fourth insulating members adjacent said first and second ends of said support frame to insulate said flexible means from said work.
5. A ground clamp as described in claim 2 wherein:
   said support frame has an opening therein oriented toward said work when said support frame is in said position, and
   said ground means includes a grounding member disposed in said opening, said grounding member being sharply pointed to provide intimate grounding contact with said work.
6. A ground clamp as described in claim 3 wherein:
   said grounding means further includes a coil spring disposed around said grounding member to bias said grounding member toward said work when said support frame is in said position, and
   said grounding member receives threadably a nut adjacent an end remote from said sharp point to provide for adjustment of said grounding member, and
   said grounding member further includes means at said end remote from said sharp point for attachment of a ground wire.
7. A ground clamp as described in claim 6 wherein:
   said first and second insulating members are pivotally attached to said support frame to provide adjustable positioning of said support frame on said work.
8. A ground clamp as described in claim 6 wherein:
   said grounding member includes a replaceable ground tip having said sharp point.